United States Patent
Harrington Legge et al.

(10) Patent No.: US 11,281,349 B2
(45) Date of Patent: *Mar. 22, 2022

(54) SYSTEMS AND METHODS CONFIGURED TO PROVIDE IMPROVED USER EXPERIENCE INVOLVING MOBILE COMPUTING DEVICES, A BACK-END SERVER AND NFC-COUPLED INTERACTIVE POSTERS INCLUDING ENCRYPTION, NETWORK OPERATION AND/OR OTHER FEATURES

(71) Applicant: Capital One Services, LLC, McLean, VA (US)

(72) Inventors: Amanda Harrington Legge, Los Altos, CA (US); Sunil Shah, Fremont, CA (US); Michael Ramos, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,336

(22) Filed: Apr. 17, 2020

(65) Prior Publication Data
US 2020/0341572 A1    Oct. 29, 2020

Related U.S. Application Data

(63) Continuation of application No. 16/528,098, filed on Jul. 31, 2019, now Pat. No. 10,795,527.
(Continued)

(51) Int. Cl.
*G06F 3/00* (2006.01)
*G06F 3/048* (2013.01)
(Continued)

(52) U.S. Cl.
CPC ............ *G06F 3/048* (2013.01); *G06F 3/0484* (2013.01); *G06F 3/0488* (2013.01); *G06F 3/147* (2013.01);
(Continued)

(58) Field of Classification Search
CPC ...... G06F 3/048; G06F 3/0484; G06F 3/0488; G06F 3/1454; G06F 3/147; G06F 8/61;
(Continued)

(56) References Cited

U.S. PATENT DOCUMENTS 8,180,289 B1    5/2012  Glickman
8,229,354 B2 *  7/2012  Sklovsky ................ H04W 4/80
                                                    455/41.1
(Continued)

*Primary Examiner* — William L Bashore
*Assistant Examiner* — David Faber
(74) *Attorney, Agent, or Firm* — Greenberg Traurig, LLP

(57) ABSTRACT

Systems and methods involving processing and/or mirroring data in real time between one or more mobile devices and a plurality of near field communication (NFC) connected interactive posters are disclosed. In one embodiment, an exemplary computer-implemented method may comprise: connecting a user mobile computing device to a server as well as coupling the device to a plurality of interactive posters via NFC; receiving user selections made on the interactive posters; processing content data related to the posters based on the user selections and/or other information; generating a GUI comprising interactive simulations corresponding to respective posters and/or statistics related to selections made on the posters; tracking, in real time, a specific experience of a user interacting with the posters; and transmitting, in real-time, data regarding the specific experience to the server.

20 Claims, 10 Drawing Sheets

Related U.S. Application Data

(60) Provisional application No. 62/839,592, filed on Apr. 26, 2019.

(51) Int. Cl.

| | | |
|---|---|---|
| *H04W 4/80* | (2018.01) | |
| *G06F 3/0488* | (2022.01) | |
| *G06F 3/0484* | (2022.01) | |
| *G06F 3/14* | (2006.01) | |
| *G06F 3/147* | (2006.01) | |
| *G06F 8/61* | (2018.01) | |
| *H04L 9/32* | (2006.01) | |
| *H04W 4/14* | (2009.01) | |
| *H04L 67/141* | (2022.01) | |
| *H04L 67/561* | (2022.01) | |

(52) U.S. Cl.
CPC ............... *G06F 3/1454* (2013.01); *G06F 8/61* (2013.01); *H04L 9/32* (2013.01); *H04W 4/80* (2018.02); *H04L 67/141* (2013.01); *H04L 67/2804* (2013.01); *H04W 4/14* (2013.01)

(58) Field of Classification Search
CPC ....... H04W 4/80; H04W 4/14; H04L 67/2804; H04L 67/141; H04L 9/32
See application file for complete search history.

(56) References Cited

U.S. PATENT DOCUMENTS

| | | | | |
|---|---|---|---|---|
| 8,363,086 B1* | 1/2013 | Shah | ............... | H04L 67/141 |
| | | | | 348/14.02 |
| 8,515,413 B1* | 8/2013 | Schilit | ............... | H04W 4/80 |
| | | | | 455/419 |
| 8,565,791 B1* | 10/2013 | Schilit | ............... | H04W 64/00 |
| | | | | 455/456.3 |
| 9,071,282 B1 | 6/2015 | Want | | |
| 9,088,862 B2* | 7/2015 | Jalkanen | ............... | H04W 4/80 |
| 9,355,409 B2* | 5/2016 | Vallat | ............... | G06Q 30/0267 |
| 9,600,720 B1* | 3/2017 | Gray | ............... | G06K 9/6288 |
| 9,858,583 B2* | 1/2018 | Sobalvarro | ............... | H04W 4/50 |
| 10,091,550 B2 | 10/2018 | Gibbon | | |
| 10,423,951 B2* | 9/2019 | Khan | ............... | G06Q 20/36 |
| 10,795,527 B1 | 10/2020 | Legge et al. | | |
| 2009/0144456 A1* | 6/2009 | Gelt | ............... | G06F 13/4022 |
| | | | | 710/8 |
| 2010/0075666 A1* | 3/2010 | Garner | ............... | H04L 67/12 |
| | | | | 455/426.1 |
| 2010/0216396 A1* | 8/2010 | Fernandez | ............... | G06Q 20/3223 |
| | | | | 455/41.1 |
| 2011/0082746 A1* | 4/2011 | Rice | ............... | H04W 4/21 |
| | | | | 705/14.56 |
| 2011/0225421 A1* | 9/2011 | Han | ............... | H04L 9/321 |
| | | | | 713/159 |
| 2011/0320293 A1* | 12/2011 | Khan | ............... | G06Q 20/3223 |
| | | | | 705/16 |
| 2012/0084132 A1* | 4/2012 | Khan | ............... | G06Q 20/3278 |
| | | | | 705/14.26 |
| 2012/0088487 A1* | 4/2012 | Khan | ............... | G06Q 20/322 |
| | | | | 455/418 |
| 2012/0143661 A1* | 6/2012 | Roberts | ............... | G06Q 30/0241 |
| | | | | 705/14.4 |
| 2012/0196586 A1* | 8/2012 | Grigg | ............... | H04B 5/0031 |
| | | | | 455/418 |
| 2012/0317194 A1* | 12/2012 | Tian | ............... | H04W 4/80 |
| | | | | 709/204 |
| 2013/0059534 A1* | 3/2013 | Sobalvarro | ............... | G06Q 30/02 |
| | | | | 455/41.1 |
| 2013/0088330 A1* | 4/2013 | Jalkanen | ............... | H04W 4/80 |
| | | | | 340/10.1 |
| 2013/0090131 A1* | 4/2013 | Jalkanen | ............... | H04W 4/02 |
| | | | | 455/456.1 |
| 2014/0026048 A1* | 1/2014 | Spirer | ............... | G06F 3/0484 |
| | | | | 715/716 |
| 2014/0062687 A1* | 3/2014 | Voticky | ............... | G06Q 30/0251 |
| | | | | 340/438 |
| 2014/0113549 A1* | 4/2014 | Beg | ............... | H04W 4/12 |
| | | | | 455/41.1 |
| 2014/0214543 A1* | 7/2014 | Gandhi | ............... | G06Q 30/0267 |
| | | | | 705/14.58 |
| 2014/0229251 A1* | 8/2014 | Lim | ............... | G06Q 30/0252 |
| | | | | 705/14.5 |
| 2015/0006266 A1* | 1/2015 | Huang | ............... | G06Q 30/0241 |
| | | | | 705/14.4 |
| 2015/0304804 A1* | 10/2015 | Lotito | ............... | H04W 4/025 |
| | | | | 455/41.1 |
| 2015/0358410 A1* | 12/2015 | Chandrasekaran | ..... | H04W 4/70 |
| | | | | 709/227 |
| 2016/0065268 A1* | 3/2016 | Dobyns | ............... | H04W 76/14 |
| | | | | 455/41.1 |
| 2016/0092966 A1* | 3/2016 | Vigier | ............... | G06Q 30/0633 |
| | | | | 705/26.8 |
| 2016/0295358 A1* | 10/2016 | Cariss | ............... | H04W 4/30 |
| 2018/0300761 A1* | 10/2018 | Pittman | ............... | H04W 4/021 |

\* cited by examiner

SYSTEMS AND METHODS CONFIGURED TO PROVIDE IMPROVED USER EXPERIENCE INVOLVING MOBILE COMPUTING DEVICES, A BACK-END SERVER AND NFC-COUPLED INTERACTIVE POSTERS INCLUDING ENCRYPTION, NETWORK OPERATION AND/OR OTHER FEATURES

CROSS-REFERENCE TO RELATED APPLICATION(S) INFORMATION

This is a continuation of application Ser. No. 16/528,098, filed Jul. 31, 2019, now U.S. Pat. No. 10,795,527, and claims benefit/priority to U.S. provisional application No. 62/839,592, filed Apr. 26, 2019, which are all incorporated herein by reference in entirety.

FIELD OF TECHNOLOGY

The present disclosure generally relates to an improved computer-based platform or system, improved computing components and devices and/or improved computing methods configured for one or more novel technological applications of processing information and communications in real time involving mobile computing devices, a back-end server and near field communication (NFC) coupled interactive posters, including encryption, network operation and/or other features.

BACKGROUND OF TECHNOLOGY

A computer network platform/system may include a group of computers (e.g., clients, servers, smart routers, etc.) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides various exemplary technically improved computer-implemented systems, e.g., a system including features such as:
a plurality of interactive posters;
a first device associated with a user, the first device comprising a Web app, wherein the first device is coupled to the interactive posters via near field communication (NFC) connection;
at least one server connected to the interactive posters and/or the first device/Web app via at least one network;
wherein one or more of the Web app, the first device, and/or the server are configured to do one or more of:
connecting the first device to the server as well as coupling the device to the interactive posters via NFC connection;
receiving/processing user selections made on the interactive posters;
processing content data related to the posters based on the user selections and/or other information;
generating a GUI comprising interactive simulations corresponding to respective posters and/or statistics related to selections made on the posters; and/or
tracking, in real time, a specific experience of a user interacting with the posters; and/or transmitting, in real-time, data regarding the specific experience to the server and/or the user.

In some embodiments, features involving use of NFC communications, such as Bluetooth™, between the posters and a user's wireless device (e.g., tablet), in conjunction with capacitive ink touch-sensitive posters are utilized to digitally mirror physical selections made on the posters to the user's tablet in real-time. Various associated technical aspects herein may also enable tracking the user's explorations of posters, i.e., the initial areas of interest that a user explored before making their final poster selections, as well as visualizing additional information related to selections, posters and/or information associated with the user's interactions.

In some embodiments, the present disclosure also provides exemplary technically improved, computer-implemented methods and computer-readable media, including media embodied an application ("App"), whether resident on a device or provided for download via a server, that include or involves features, functionality, components and/or steps consistent with those recited above.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
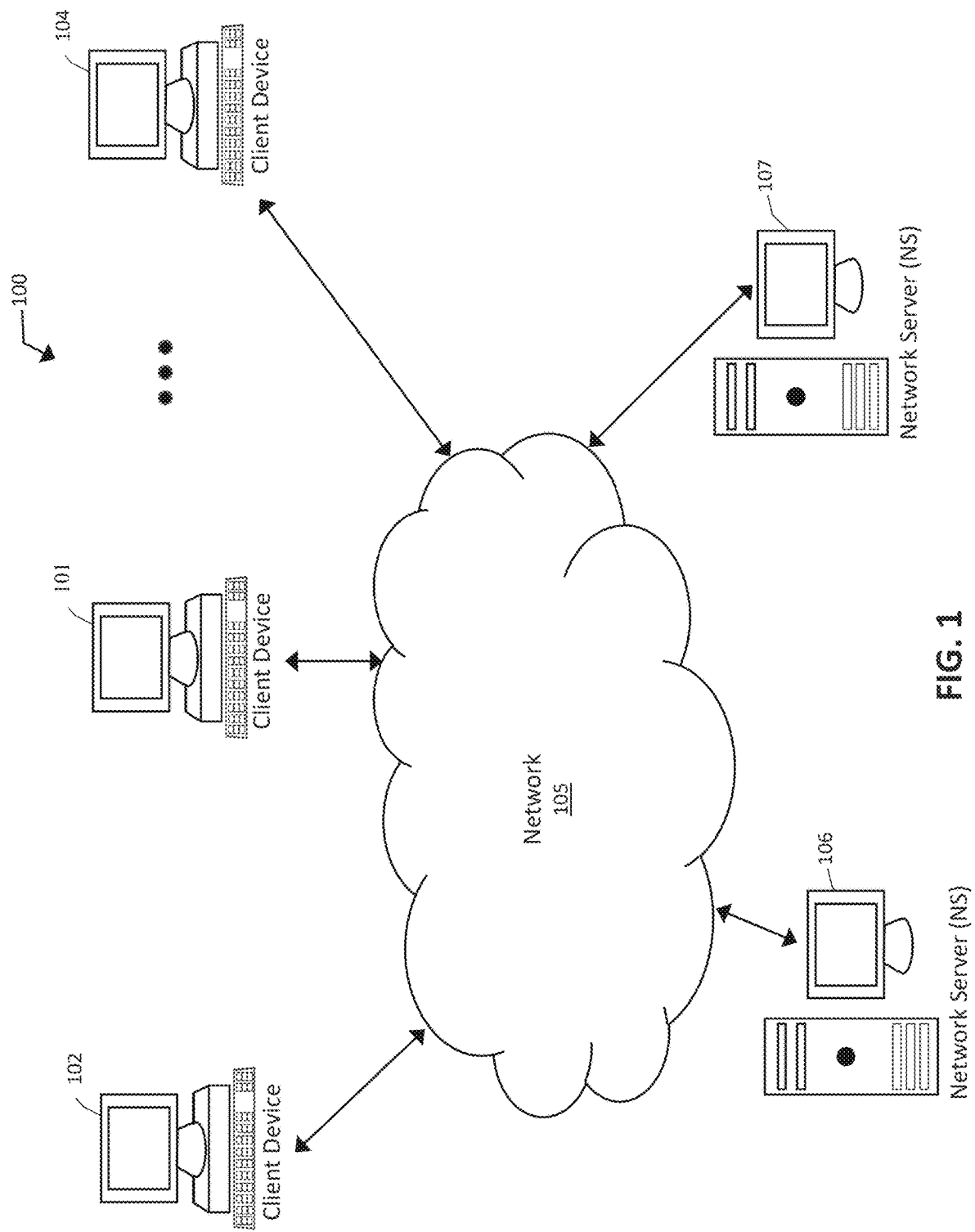
FIG. 1 is a block diagram depicting an exemplary computer-based system and platform, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer- or machine-readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (RC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
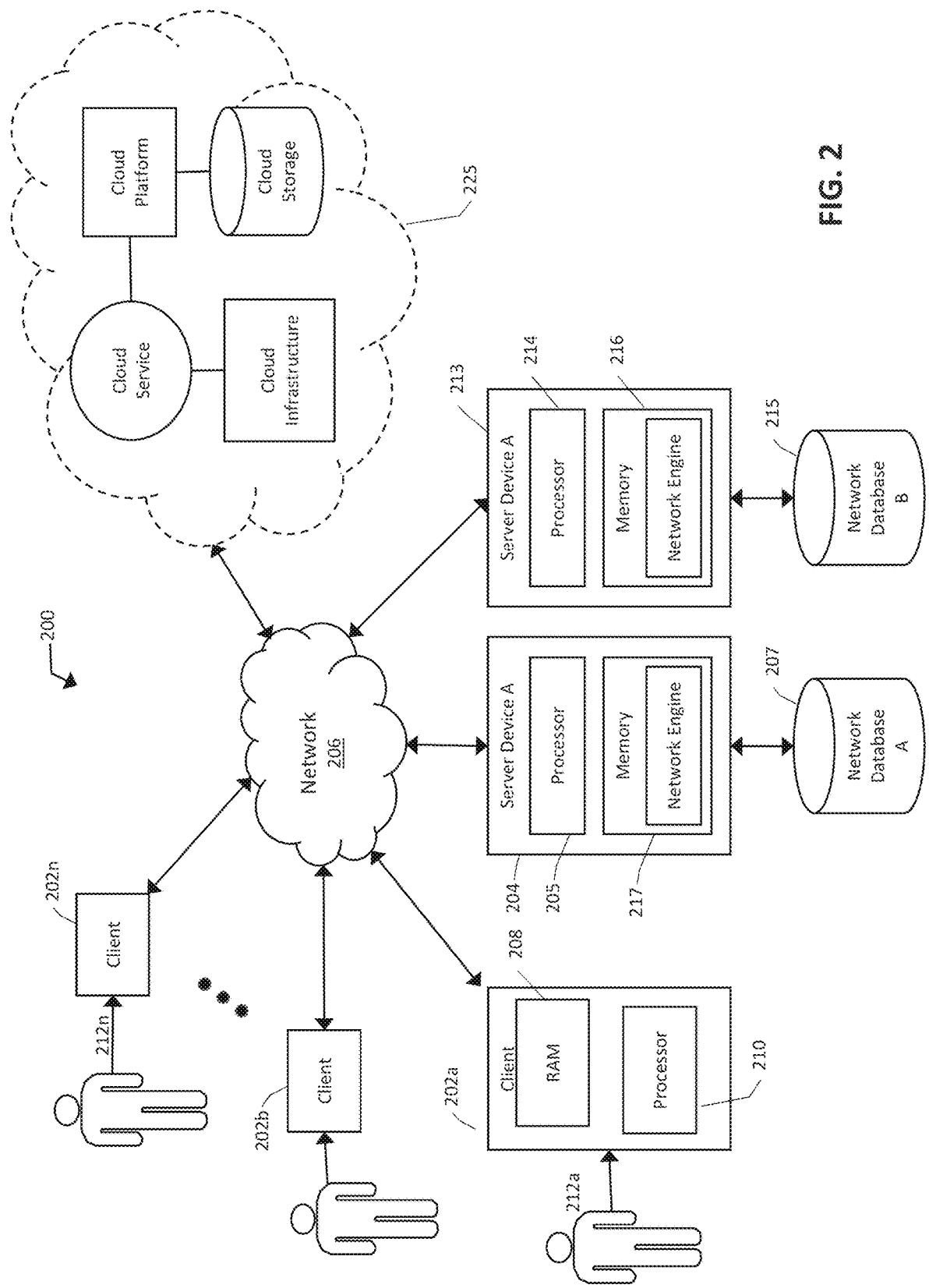
FIG. 2 is a block diagram depicting another exemplary computer-based system and platform, in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices. In some embodiments, examples of member computing devices 202a-n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a-n may be specifically programmed with one or more application programs in accordance with one or more principles/methodologies detailed herein. In some embodiments, member computing devices 202a-n may operate on any operating system capable of supporting a browser or browser-enabled application, such as Microsoft™, Windows™, and/or Linux. In some embodiments, member computing devices 202a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202*a-n*, users, 212*a-n*, may communicate over the exemplary network 206 with each other and/or with other systems and/or devices coupled to the network 206. As shown in FIG. 2, exemplary server devices 204 and 213, which may each include a processor 205, 214 and memory 216, 217, may be also coupled to the network 206. In some embodiments, one or more member computing devices 202*a-n* may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
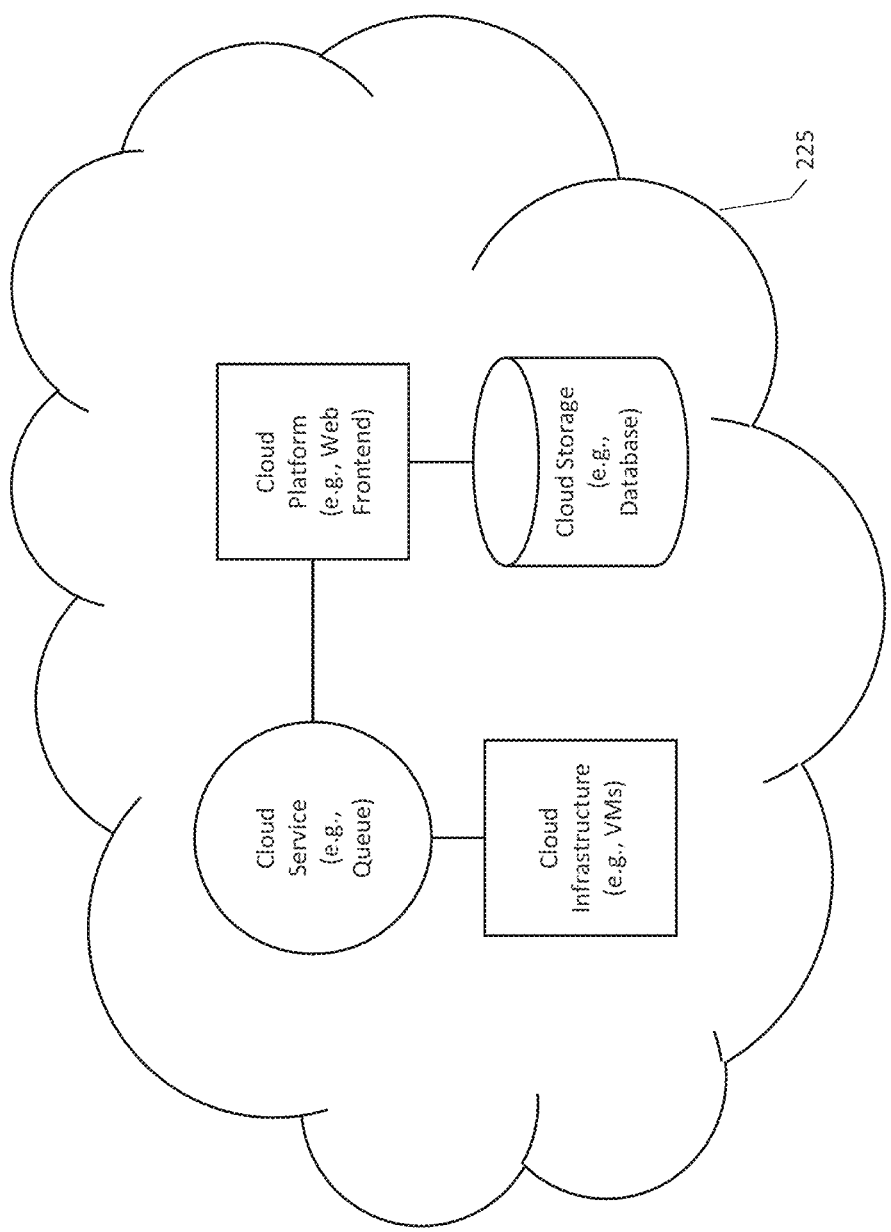
FIGS. 3 and 4 are diagrams illustrating two exemplary implementations of cloud computing architecture/aspects with respect to which the disclosed technology may be specifically configured to operate, in accordance with one or more embodiments of the present disclosure.
Figure 4:
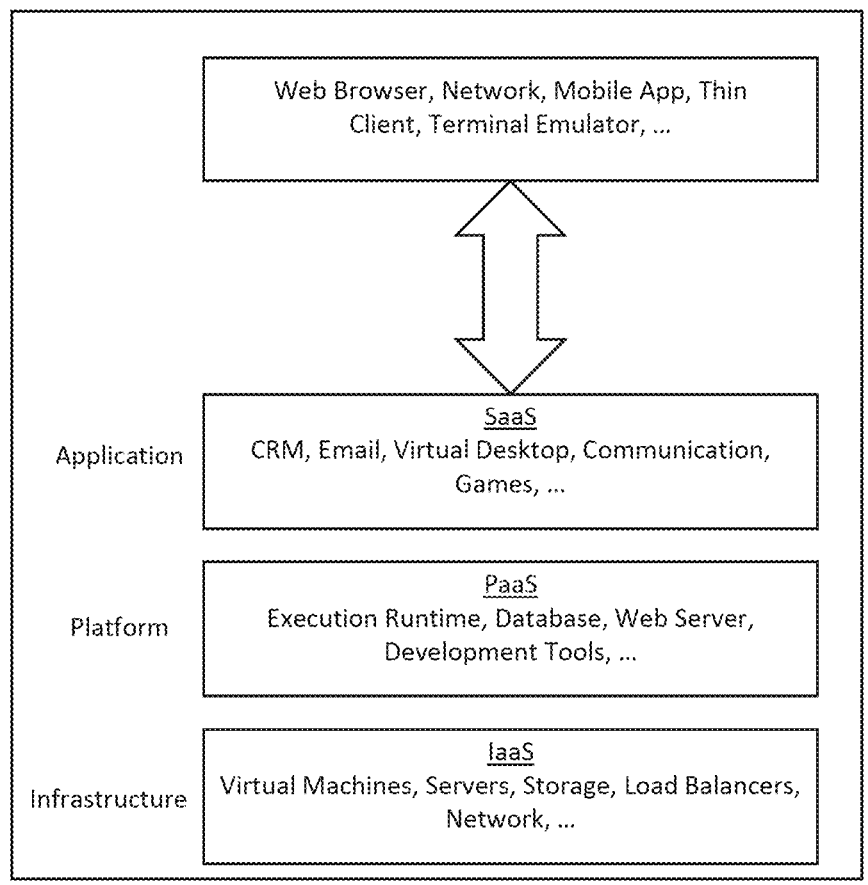

In some embodiments, the exemplary inventive computer-based systems/platforms, the exemplary inventive computer-based devices, and/or the exemplary inventive computer-based components of the present disclosure may be specifically configured to operate in or with cloud computing elements and/or architecture 225 such as, but not limiting to: infrastructure a service (IaaS), platform as a service (PaaS), and/or software as a service (SaaS). FIGS. 3 and 4 illustrate schematics of exemplary implementations of the cloud computing/architecture(s) in which one or more aspects of the exemplary inventive computer-based systems/platforms, the exemplary inventive computer-based devices, and/or the exemplary inventive computer-based components of the present disclosure may be specifically configured to operate.

FIGS. 5 through 8B illustrate systems and methods of processing information and communications in real time involving mobile computing devices, a back-end Web server, and interactive posters that are coupled via Bluetooth™ to each other and at least one mobile device. The following embodiments provide technical solutions and/or technical improvements that overcome technical problems, drawbacks and/or deficiencies in the technical fields involving interactive posters, such as electronically- or computer-interactive posters. As explained in more detail, below, technical solutions and/or technical improvements herein include aspects of improved security (e.g., secure data, secured communications, encryption, etc.), network connectivity such as use of Bluetooth™ and Bluetooth™ authentication, tracking data and activity related to poster interactions and explorations of the posters by the user as well as to related statistics, mirroring data between electronic devices, and/or real-time information processing among computing components of the system. Based on such technical features, further technical benefits become available to users and operators of these systems and methods. Moreover, various practical applications of the disclosed technology are also described, which provide further practical benefits to users and operators that are also new and useful improvements in the art.

Figure 5:
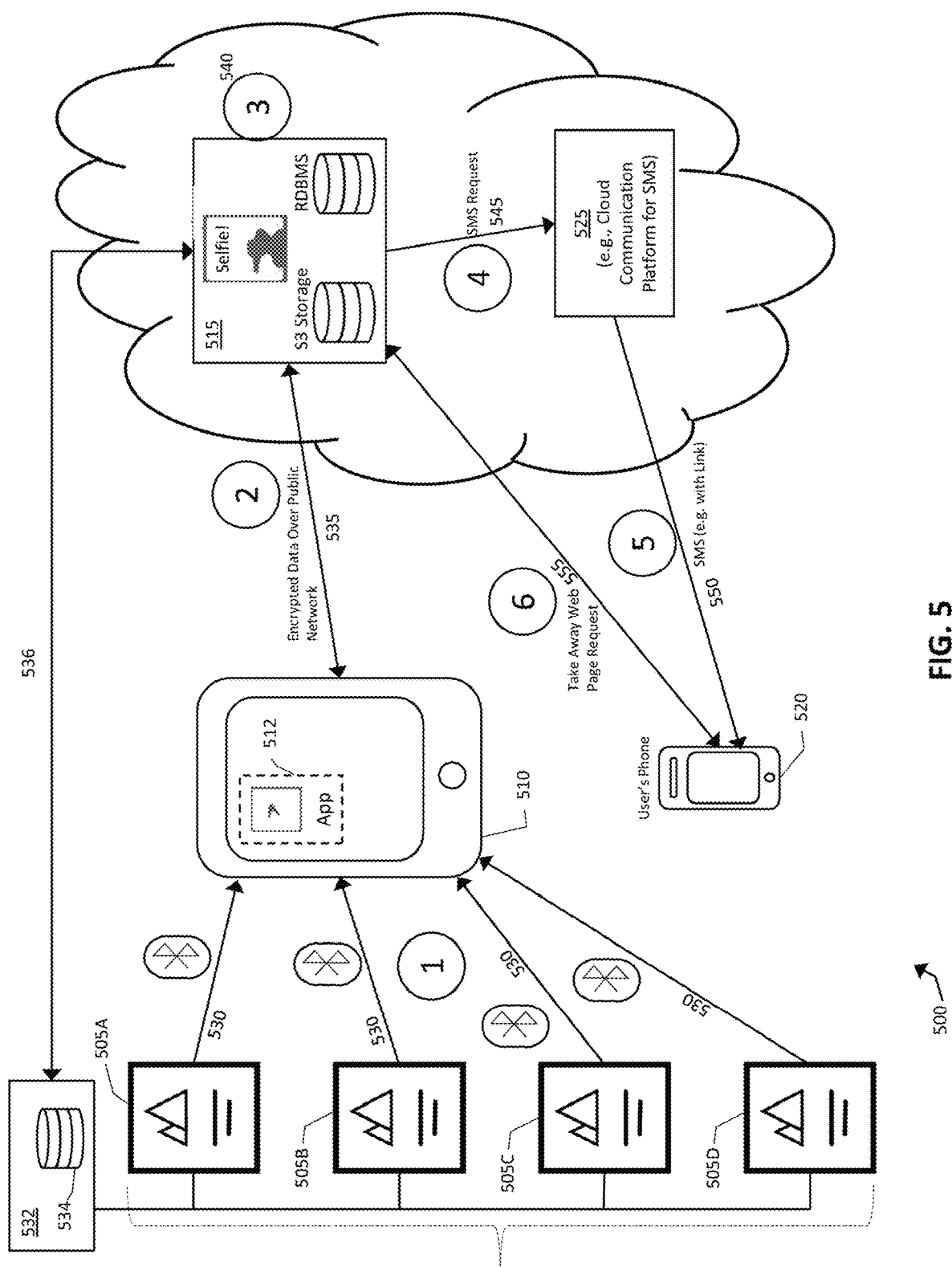
FIG. 5 depicts a block diagram of another exemplary computer-based system or platform, in accordance with one or more embodiments of the present disclosure.
Figure 6:
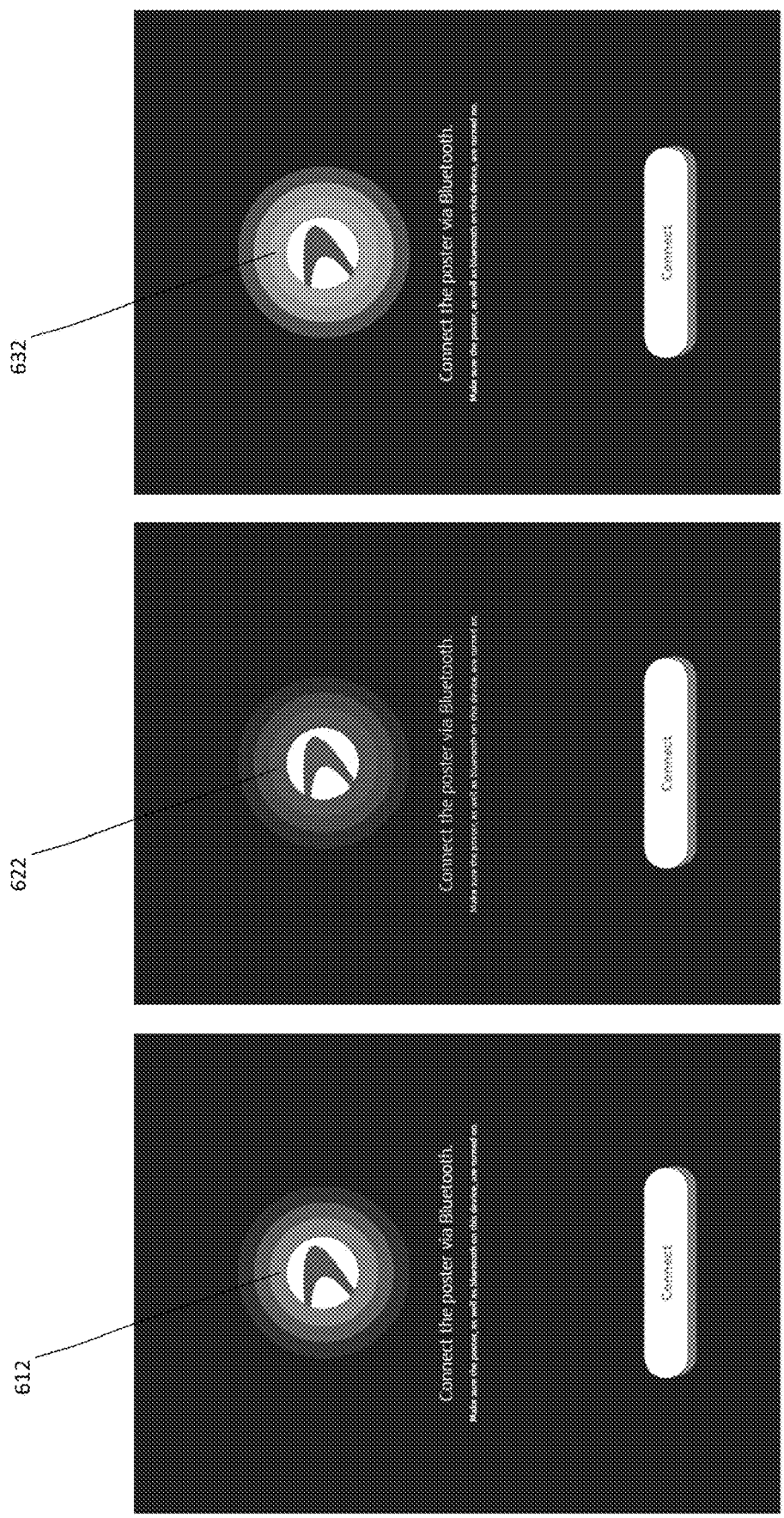
FIGS. 6A-6C depict diagrams of exemplary graphical user interfaces (GUIs) and an associated execution of computer code in accordance with one or more embodiments of the present disclosure.

FIG. 5 depicts a block diagram of another exemplary computer-based system 500 or platform in accordance with one or more embodiments of the present disclosure. Here, not all of the components illustrated in FIG. 5 may be required to practice one or more embodiments, and variations in the arrangement and type of the components may be made without departing from the spirit or scope of various embodiments of the present disclosure. As shown in FIG. 5, the system 500 may comprise a plurality of interactive posters 505*a*, 505*b*, 505*c*, 505*d*, a first device 510 such as a network-connected tablet associated with a user, at least one Web server 515 in communication with the first device 510 over a network such as a public network, an SMS/text messaging component 525 such as a cloud communication platform for sending SMS messages, and a second device 520 such as a smartphone or other mobile device associated with the user. Referring to FIG. 5, six exemplary steps beginning with user interaction at 'Step 1' 530 with the interactive posters 505, and proceeding through associated communication and data processing steps, Step 2 through Step 6, that subsequently occur among the computing devices in the system 500, are shown.

In some embodiments, innovations of the present disclosure may be described in the context of the computerized/computer-implemented interactive posters 505 in conjunction with the interactions that commence, in Step 1 at 530, between the first device 510 and the interactive posters 505. With regard to the physical interaction with the posters 505, the user (e.g., owner or operator) of the first device 510 and the second device 520 approaches and interacts with the interactive posters 505. While the interaction may be near-field interaction or detection of the user's or their phone's proximity, in the illustrative embodiments described below, the interaction comprises the user touching various touch-responsive areas of the interactive posters 505. Here, for example, the interactive posters 505 may be capacitive ink posters or conductive ink posters that have metal-patterned regions used to electrically detect and register touches may by individuals at predetermined points on the poster, i.e., the spots at which the metal "ink" touch sensors are printed. Nonlimiting examples of such posters include posters made by InkPut™, and other capacitive or conductive ink poster companies. Interactions or selections of such posters may also be implemented via near-field wireless communication (NFC), such as posters made by 40Visuals™, and other NFC poster companies. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other. In some embodiments, systems and methods herein may begin tracking these touches or interactions and storing associated data once the user has entered within Bluetooth™ communication range of the posters 505 and/or once the user has been authenticated into an encrypted session via Bluetooth™, as explained in more detail below.

Step 1—Non-Limiting Illustrative Examples of User/Device Authentication and Establishing Secure Session In FIG. 5, the interactive posters 505*a*, 505*b*, 505*c*, 505*d* may be coupled to the Web server 515, such as via a network, as well as coupled to each other, such as via a wired connection or a Bluetooth™ link. According to embodiments of the present disclosure, the Web App 512 of the first device 510 may be utilized to perform various important communication, authentication and encryption features, particularly at the start (Step 1) of the exemplary six-step process described herein. The Web App 512 may already be resident on the first device 510, or it may be downloaded onto the first device 510 at the start of various disclosed embodiments. Here, for example, a user may be prompted to download the Web App 512 when he or she comes within range of the posters 505, or the Web App 512 may be installed whenever the user otherwise desires to take advantage of the disclosed technology. Once the Web App 512 is loaded or begins operating on the first device 510, the Web App 512 securely authenticates itself with the Web server 515 and establishes a secure session therewith, including encryption of any data or information being transmitted between the first device 510 and the Web server 515. At this time, the Web App 512 and the first device are connected to all of the posters 505 within range via Bluetooth™ connection. Once the user and first device 510 are interconnected with the posters 505, the user may begin making their touch selections in the touch-sensitive areas of the interactive posters 505. Further, as a result of the secure Bluetooth™ connection between the first device 510 and the posters 505, the user's selections on the posters 505 are securely mirrored to the first device 510, e.g., the user's tablet, via the Web App 512.

As described herein, various embodiments of the exemplary inventive computer-based systems/platforms, the exemplary inventive computer-based devices, and/or the exemplary inventive computer-based methods or components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD, RIPEMD-160, RTRO, SHA-1, SHA-2, Tiger (TTH), WHIRLPOOL, RNGs). These examples are, of course, illustrative and not restrictive.

Turning back to the physical interactions between the user and the posters 505, various data including the timing of the touches, the specific poster 505 touched, the area within the respective poster 505 that is touched, and, optionally, information regarding any user devices that are detected in proximity at the time of the touches, are all registered and stored for subsequent processing. This data may be stored both locally via the posters 505 or in at least one computing component 532 or associated database 534, and/or the data may be communicated, at 536, and stored remotely at the Web server 515 or in an associated remote database.

Step 2—Non-Limiting Illustrative Examples of Pre-Processing and Encryption Via the Web App In another step involving the user, typically performed in an earlier phase of the six-step process, the user may enter various identifying information, such as name, phone number, email address, and/or an identifying image such as a selfie. Further, if the identifying information is a picture such as a selfie, a filtering effect may be provided to the picture by the Web App 512 to provide an adjusted image that is augmented, altered and/or configured to align with the subject matter of the interactive posters 505 and/or with the selections that the user has made on each such poster. Once any such filtering or adjustment of the user image is completed, various identifying data regarding the user's interactions with the posters is encrypted by the Web App 512. Here, for example, the Web App 512 may encrypt information including the geographical location of the posters 505, the user's selections made on each of the posters 505, date and time stamp information associated with the user's interactive session, as well as the user's personal information such as name, phone number, email address, and image. Once this information is encrypted, it may be sent, at 535, to the Web server 515, such as via a network.

Step 3—Non-Limiting Illustrative Examples of Web Server: Pre-Processing and Internal Processing Once start of user interaction with the posters 505 has been confirmed, the Web server 515 performs processing, in Step 3 at 540, related to processing data collected centrally at the Web server 540 and distributing associated information and Web pages to the user. Upon receipt of the encrypted personal information, the Web server 515 decrypts this information and stores it in one or more databases. In some embodiments, the Web server 515 may then also create a folder in which to store a deliverable to the user, such as a Web page, and/or any of the necessary assets that the Web server 515 utilizes to create the deliverable, such the user's poster selection, the user's selfie, and the like. The Web server 515 may utilize additional security in creating the folder and providing the deliverable to the user. Here, for example, the Web server 515 may generate a 32-byte (256 bit) random number and create the folder with a name based on the random number. Further, when the deliverable is a Web page, the URL used for the Web page and sent to the user may include the random number, e.g., www.xyz.com/[Random#]/UserWebPage.htm. As such, here, use of the randomly-generated 32-byte number will ensure security of the User's deliverable Web page, unless they share the link with someone else. In some embodiments, the Web server 515 may also include additional information in the deliverable that may be of interest or otherwise useful to one or both of the user and/or a company associated with the interactive posters 505 or the Web server 515. Here, for example, such additional information may include: (i) recommendations to the user, including personalized recommendations based on the user's selections on the posters 505 and/or other user information acquired or known; (ii) recommendations for services that may benefit the user and/or the user may desire; (iii) recommended subscriptions to information-providing and/or other services, (iv) establishing additional, closer, and/or further relationship(s) with the user, and the like.

Step 4—Non-Limiting Illustrative Examples of Web Server: Processing Information for Delivery Once the Web server 515 has generated and prepared the deliverable for transmission to the user, the Web server may initiate processing to distribute the deliverable. Here, for example, the Web server 515 may embed the URL link into a pre-existing SMS message. Further, as shown in the example embodiment of FIG. 5, the Web server 515 may then affect delivery of the SMS message, such as by initiating a request, at 545, to a third-party SMS server provider to send the SMS message. In some embodiments, other forms of distribution may be used, such as delivery to an email address, and/or other electronic communication to the user.

Step 5—Non-Limiting Illustrative Examples of Transmission of Deliverable to User In some embodiments, such as the example shown in FIG. 5, a third-party SMS service provider may then transmit the SMS message to the user, at 550, such as by sending the SMS message to the mobile phone number that the user provided via the Web App 512.

Step 6—Non-Limiting Illustrative Examples of User Acquisition of Information in Deliverable Finally, referring to the embodiment of FIG. 5, the user may select customized information in the deliverable that has been prepared for the user by the Web server 515, which may then be provided to the user from the Web server 515, i.e., at 555. Here, for example, the user may select or click the secure link established using the random number, and then download the customized Web page generated by the Web server 515 for that user. Upon selection of the secure link, one or more Web pages, which may include information and/or recommendations customized for that user, will be loaded onto the user's smartphone, smartwatch and/or other computing element, component or device.

FIGS. 6A-6C depict diagrams of exemplary graphical user interfaces (GUIs) and an associated execution of computer code in accordance with one or more embodiments of the present disclosure. However, variations in the arrangement, color, and/or type of GUI elements may be made without departing from the spirit or scope of various embodiments of the present disclosure. In some embodiments, attempting to establish the Bluetooth connection between the first mobile device of the user and the interactive posters has certain technical problems and technical difficulties, particularly when there's a necessity for real-time connection and communication, as here. Regarding the technical problem, the existing techniques for setting up a Bluetooth connection and/or set-up process are a blind process in the context of interactive posters, such as capacitive ink posters. Namely, a user who hopes to engage with such posters via Bluetooth is limited to attempting to touch the posters and then hoping that their physical touches are correctly mirrored in real-time to their tablet or mobile device. There is no verification or acknowledgement of any aspect of the Bluetooth connection, whether that a connection is trying to be established, whether the issue relates to a handshake or other part of the setup, or a confirmation that the link is correctly and/or fully established. In other words, it could be based solely on the capacitive ink poster touches and any final/confirmatory response thereto.

In the technical solutions set forth by way of illustration in FIGS. 6A-6C, both color and animation, in the context of such Bluetooth connection attempt, make the necessary real-time connection statuses explicit, i.e., for users who are trying to connect to capacitive ink posters via Bluetooth. Here, for example, a tri-color scheme with particular radial animation may be used, such as a blue color and animation 612 especially the radial display utilized to represent a pending connection, such red color and animation 622 utilized to represent a connection error, and such green color and animation 632 utilized to represent a successful connection. Such blue, red, and green colors, because of their intuitive color pattern representations, used in conjunction with attention-grabbing radial motion animations, not only facilitate but, indeed, may also accelerate the Bluetooth connection and set-up process, such as when a connection problem and/or issue is thereby identified. Here, without such visual representation on the user's mobile device such as tablet, the Bluetooth connection process for capacitive ink posters was previously a blind process based solely on touch responses.

Figure 7:
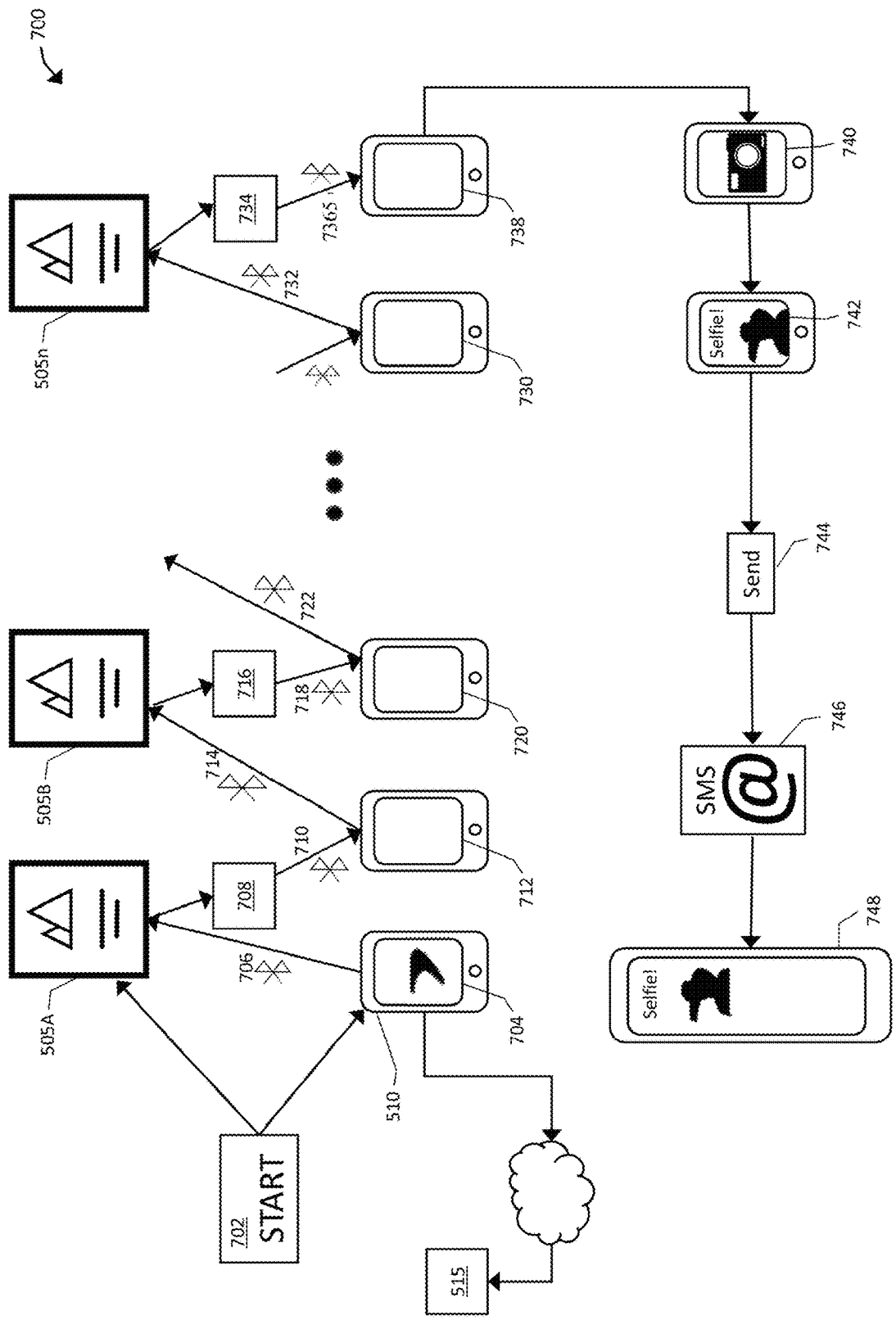
FIG. 7 depicts a high-level flow diagram illustrating an exemplary computerized interactive user experience, in accordance with one or more embodiments of the present disclosure.

FIG. 7 depicts a high-level flow diagram illustrating an exemplary computerized interactive user experience 700 in accordance with one or more embodiments of the present disclosure. The exemplary user experience 700, starting at 702, may commence when a user comes within proximity of the interactive posters and initiates the Web App on their mobile device 510, at 704. The Web App may connect, at 704, with the Web server 515 and begin the secure session, as detailed elsewhere herein. After the session is initiated, the user first engages with a first interactive poster 505A, wherein Bluetooth communication between the first device 510 and the first poster 505A is established, at 706. The user then engages with the first poster 505A and provides a first interaction or first user selection 708, such as a touch selection of one option at a touch-sensitive region. This selection 708 is mirrored in real time via the Bluetooth connection, at 710, such that the user's first selection 708 at the first poster 505A is contemporaneously mirrored onto a simulation of the first poster that is generated by the Web App and depicted on the user's mobile device, at 712, i.e., displayed on the first device 510. Various other information such as statistics regarding the first poster 505A may also be displayed.

In general, functionality regarding the real-time assembly of statistics (e.g., via various network and/or Bluetooth connection(s), etc.), the storage and maintenance of statistics (e.g., via the Web App, Web server, etc.), and the real-time dissemination of such statistics (e.g., via certain Web server functionality, etc.) provide technical solutions to the technical problems exigent in previous attempts to use such information to its fullest (real-time) potential. Among other things, for example, processing such information via near field communication, such as Bluetooth™, may avoid delays and other associated technical drawbacks with processing such information via or through additional computing components, or even up into the cloud or through cloud-resident components. Further, statistics regarding the interactive posters may include or involve data regarding other users interactions with particular posters, data regarding user-interactions with posters at the same or geographically different locations, statistics that consider or are based on same or similar portions of a poster or related posters, and the like. Other relevant statistics are also described elsewhere herein.

The user may then move in to close proximity with a second interactive poster 505B, at which time Bluetooth communication is established between the first device 510 and the second poster 505B, at 714. As with the first poster 505A, the user may make a physical interaction with the second poster 505B, establishing a second user selection 716, such as a touch selection of one option at a touch-sensitive region. This selection 716 is mirrored in real time via the Bluetooth connection, at 718, such that the user's second selection 716 at the second poster 505B is contemporaneously mirrored onto a simulation of the second poster that is generated by the Web App and depicted on the user's mobile device, at 720. Bluetooth communication with a new interactive poster may then be established, at 722, though the full series of posters is not shown in FIG. 7 for the sake of conciseness. After display and interaction, at 730, with a simulation of a second-to-last interactive poster (not shown), the user may then move in to close proximity with a final interactive poster 505*n*, at which time Bluetooth communication is established between the first device 510 and the final poster 505*n*, at 732. As with the first two posters, the user may make a physical interaction with the final poster 505*n*, establishing a final user selection 734, such as a touch selection of one option at a touch-sensitive region. This final selection 734 is mirrored in real time via the Bluetooth connection, at 7365, such that the user's final selection 734 at the second poster 505B is contemporaneously mirrored onto a simulation of the final poster that is generated by the Web App and depicted on the user's mobile device, at 738.

Upon completion of interactions with the posters, the user experience may continue as described above. In some embodiments, for example, the user may then provide their personal information including a picture, at 740. The picture may then be modified, such as by the Web App 512, to provide, at 742, an adjusted image that is augmented, altered and/or configured to align with the subject matter of the interactive posters 505 and/or with the selections that the user has made on each such poster. Then, at 744, the Web server 515 initiates instructions to have the deliverable provided to the user. Next, at 746, the deliverable is provided to the user, such as via an SMS message or an email. Finally, the user then opens the deliverable, at 748, which provides any customized content or information intended for the user, such as a customized link generated by the Web server 515.

Figure 8A:
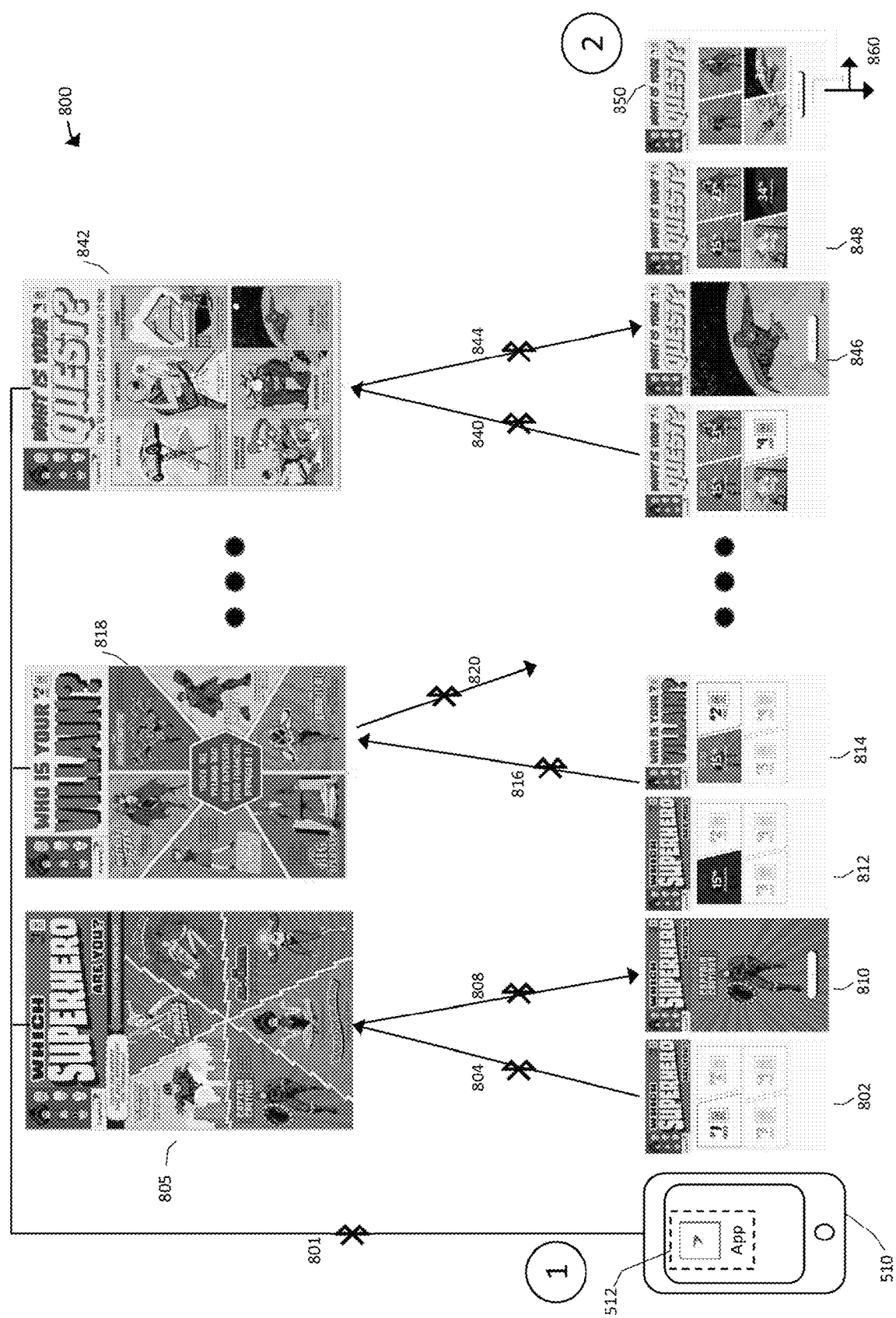
FIGS. 8A-8C depict a flow diagram illustrating an exemplary computerized interactive user experience, including details of one representative application thereof, in accordance with one or more embodiments of the present disclosure.
Figure 8B:
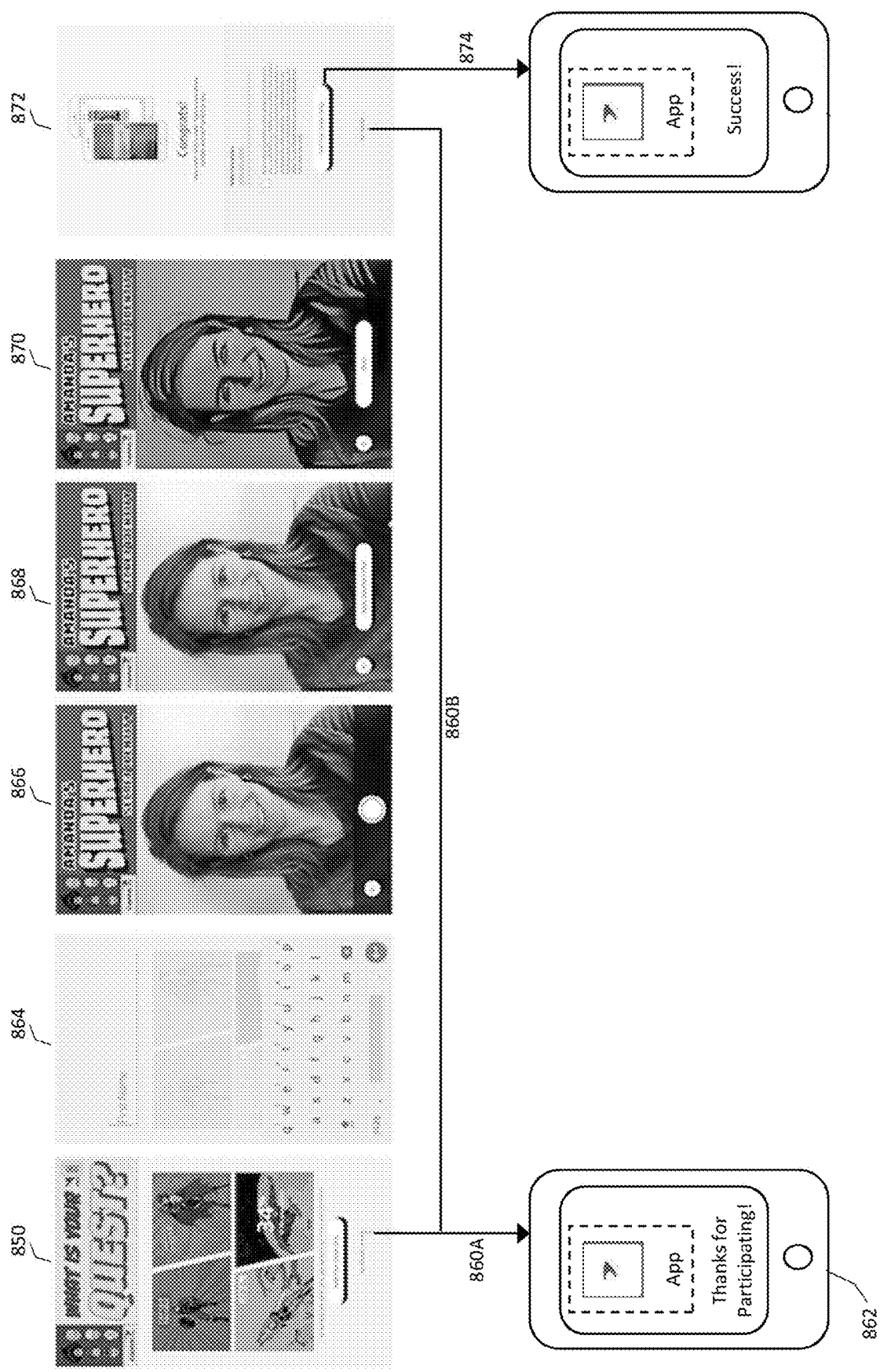
Figure 8C:
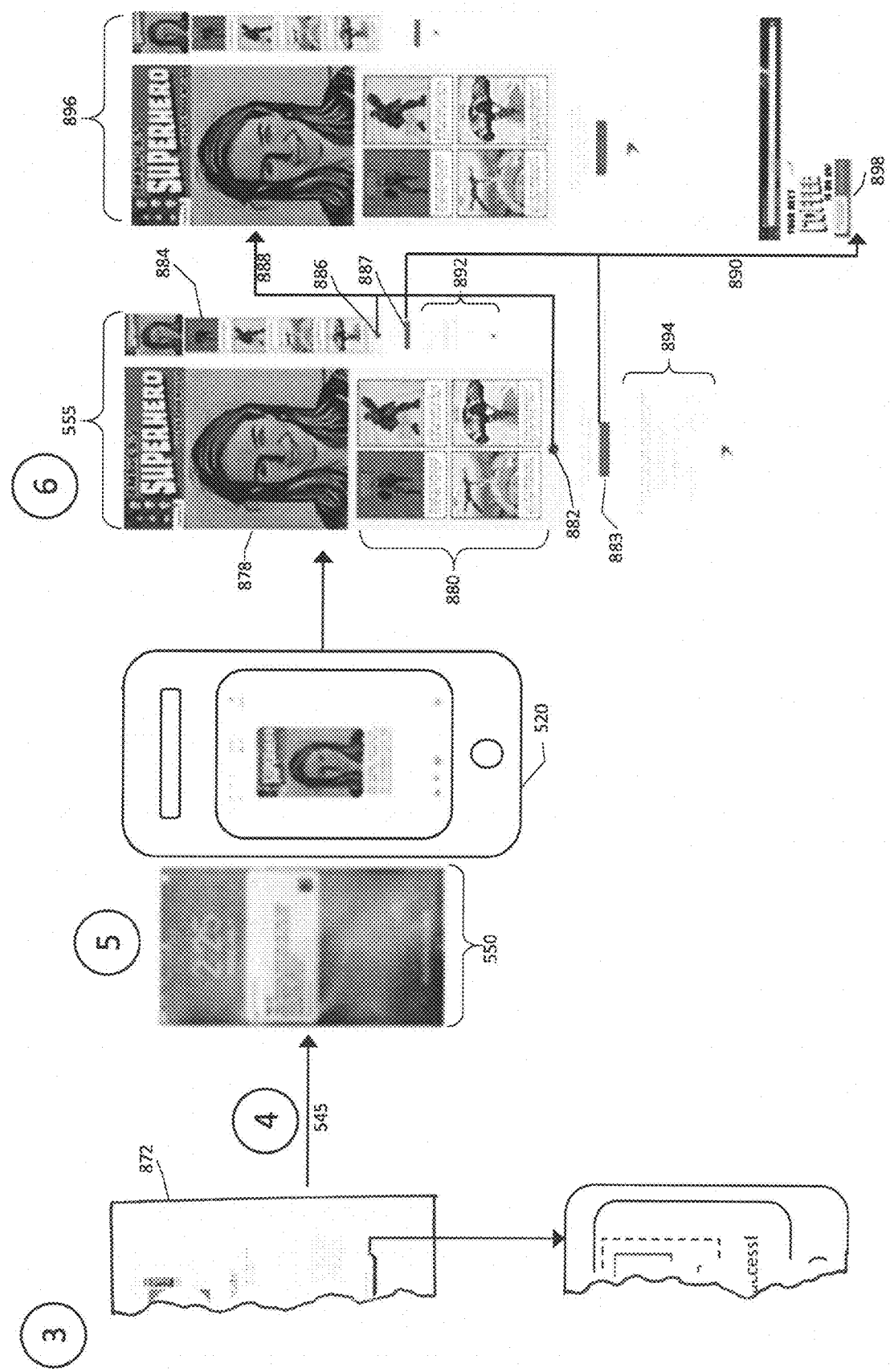

FIGS. 8A-8C depict a flow diagram illustrating an exemplary computerized interactive user experience 800, detailing a practical application thereof, in accordance with one or more embodiments of the present disclosure. As shown via 801 in FIGS. 8A-8C, the user device 510 may be coupled via Bluetooth to all of the interactive posters 805, 818 . . . 842. The exemplary user experience 800, starting at 802, may commence when a user comes within proximity of the interactive posters and initiates the Web App 512 on their mobile device 510. After a session is initiated, the user first engages in Bluetooth communication, at 804, with a first interactive poster 805. In the example embodiment shown, the first poster 805 may be a capacitive ink poster asking "Which Superhero Are you?", referring to a superhero related to the user's financial behavior, and having several touch-sensitive regions that allow the user to indicate the type of (financial) superhero they are. As explained above, the user then engages with the first poster 805, and provides a touch selection, which is transmitted to and mirrored on the user device, at 808. The Web App then displays, at 810, a GUI that includes an image corresponding to the type of superhero that the user selected. At 812 and 814, the user may then view and interact with the information and/or content subsequently provided to the user, e.g., via the Web App 512 and Web server 515. Next, the user will engage with a second interactive poster 818, including establishing Bluetooth communication between the user device 510 and the second poster 818, at 816. In the example of FIGS. 8A-8B, the second poster asks the user "Who is Your Villain?", here, referring again to a type of financial 'enemy' that the user faces in their life. As with the first poster 805, a selection is made and transmitted, at 820, to the user device for mirroring via a simulation of the second poster 818 displayed to the user. Other posters, such as "What is Your Current [financial] Battle?" may also be engaged with by the user.

At the end of the physical experience, the user approaches a final poster 842 entitled "What is Your Quest?", again referring to a financial desire that the user presently has, and Bluetooth communication is established between the user device 510 and the final poster, at 840. Then, as with prior posters 805, 818, a selection is made and transmitted, at 844, to the user device for mirroring via a simulation of the final poster 842 displayed to the user. The Web App may then display an image corresponding to the quest that the user selected, at 846, as well as provide additional screens, 848 and 850, allowing the user to view information and/or interact with content that is provided to the user via the Web App 512 and the Web server 515. At the final physical experience page displayed 850, the user is prompted to provide various information or navigation instructions, at 860. Here at screen 850, as shown in FIG. 8B, the user may opt to finish the experience, at 860A, at which time they would be provided with a final screen 862 thanking them for participating. Alternatively, the user may opt to enter various personal information, at 864, such as name, phone number, email address and the like. Further, the user may opt to provide an image at 866, such as a selfie. In the example experience shown, the Web App then alters the selfie, at 868 and 870, to generate a comic book like adjusted image of the user, as shown at 870. At a final interactive screen, 872, the user may be prompted to confirm that a final summation of the information that the user provided, including superhero images and/or the superhero motif that the user selected, may then be transmitted to the user, such as via an SMS message sent to their smartphone or other mobile device and/or via email. As mentioned above, such deliverable provided to the user may also include recommendations such as, here, financial recommendations that are personalized to the user based on the selections that the user made and/or any other information available regarding the user or their financial situation. For example, such a financial recommendation may include a recommendation, based on selecting a particular interest (e.g., via selection of an associated character), that would reference specific product(s) and/or service(s) relevant for that user, e.g., refinance a loan, open an account, get insurance, etc. In one embodiment, the Web page would keep the user within entity's computing environment, which provides technical advantages such as maintaining critical security with respect to financial and/or personal information as well as various practical advantages to keep the user within an online environment and/or to develop further helpful information regarding the user via the provider's Website. Following such functionality, e.g. upon acceptance and completion of this step, at 874, the Web App may generate a final 'success' screen for display to the user, thanking them for participating in the experience 800.

Referring to FIG. 8C, additional processing may also be performed. Beginning with the user's entry of their personal information, at 872, FIG. 8C further illustrates Steps 4, Step 5, and Step 6, described above. For example, a request may be sent, at 545, for the third party to provide an SMS message, the SMS message may be provided to the user's mobile device and/or email account, at 550, and then the customized page or deliverable may be displayed to the user, at 877. Moreover, FIG. 8C illustrates additional information, content and/or functionality that may be provided to the user, e.g., based on the connection of the user with the Web server such as via a Web link 555, as described in Step 6. When a Web link is selected by a user, for example, a Web page may be displayed showing the adjusted image of the user, at 878, as well as their selections may on the posters, at 880. Such information may also be displayed in a smaller, vertical tile format, at 884. Further, additional buttons or functionality may also be provided and displayed to the user, at 882 and 886, which may direct them to 888 or populate additional GUIs, screens, and/or customized information or content, e.g., at 896. Still other buttons, GUI elements, or options, e.g. at 883 and/or 887, may direct the user, at 890, to content, information, services and/or other customized recommendations such as 898, which may be determined based on information assembled, obtained and/or known regard the user. Moreover, still further selections, options and/or functionality may be provided to the user, e.g., at 892 and/or 894, such as to suggested services to the user, subscribe them to suitable information services, and/or otherwise provide them with customized information and/or establish further relationship with the user.

At least some aspects of the present disclosure will now be described with reference to the following numbered clauses.

1. A system comprising:
   a software application installed on a first computing device associated with a user;
   a plurality of interactive posters, wherein each interactive poster of the plurality of interactive posters comprises: (i) one or more regions configured to allow the user to make one or more user selections and (ii) a circuitry configured to couple a respective interactive poster to one or more mobile computing devices via a wireless protocol, wherein the wireless protocol is based on a Bluetooth or another near-field wireless communication (NFC) protocol;
   at least one server that is operationally communicated, via at least one network, with: (i) the software application of the first computing device, and/or (ii) the plurality of interactive posters;
   non-transitory computer-readable media, associated with the software application, the at least one server, or both, wherein the computer-readable media stores instructions that, when executed by at least one processor of the system, cause the system to perform operations comprising:
   coupling the first computing device to the one or more interactive posters via the wireless protocol;
   transmitting information among the first computing device, the one or more interactive posters, and/or the at least one server, via the at least one network in real time;
   tracking, in real time, a user-specific experience comprising the user's one or more interactions with the one or more interactive posters;
   causing to generate at least one graphical user interface (GUI), on the first computing device, the at least one GUI comprising:
   one or more user interface (UI) simulations of the one or more interactive posters, identifying the one or more user selections in real time; and
   at least one poster-related statistic, at least one user selection-related statistic, or both; and
   wherein the at least one poster-related statistic, the at least one user selection-related statistic, or both are determined based on one or more interactions with the one or more interactive posters by the one or more other user;
   providing, to the user, via the GUI, first data related to the one or more interactive posters based on at least one of chosen from: the one or more user selections, other user-related information associated with the user that is known or collected via at least one of: the at least one server, the software application, and the first computing device;
   providing, to the user, from the at least one server, second data associated with the user-specific experience, wherein the second data comprises information based on the at least one poster-related statistic, the at least one user-selection-related statistic, or both.

2. The system of claim 1 or the invention of any claim herein, wherein each region of the one or more regions of the plurality of interactive posters comprise respective electronically-coded interactive display imagery having one or more electronically-coded portions.

3. The system of claim 2 or the invention of any claim herein, wherein each interactive poster is configured to remain in a sleep mode until each respective electronically-coded interactive display imagery responds to at least one real-time user-specific interaction associated with the particular user, chosen from:
   i) at least one user-directed interaction, when the particular user interacts with at least one electronically-coded portion of a respective electronically-coded interactive display imagery of a respective poster of the plurality of interactive posters,
   ii) at least one non-user-directed interaction, when the mobile computing device, operated by the particular user, communicates with one or more posters of the plurality of interactive posters, the at least one electronically-coded portion of the respective electronically-coded interactive display imagery of the respective poster of the plurality of interactive posters, or both.

4. The system of claim 2 or the invention of any claim herein, wherein the GUI further comprises:
   i) respective interactive simulations of the respective interactive posters, each simulation comprising at least one interactive interface element that mirrors, in real time, the at least one real-time user-specific selection of the at least one electronically-coded portion of the respective electronically-coded interactive display imagery of the respective poster of the plurality of interactive posters, and
   ii) at least one statistic related to at least one selection of the at least one electronically-coded portion of the respective electronically-coded interactive display imagery of the respective poster of the plurality of interactive posters by at least one other user.

5. The system of claim 3 or the invention of any claim herein, wherein the user-specific experience further comprises interaction of the user in relation to the plurality of interactive posters to form user-specific experience data that is based at least in part on one or both of:
   i) a plurality of user-directed interactions of the user with at least one poster of the plurality of interactive posters, and/or ii) the at least one non-user-directed interaction of the mobile computing device with the at least one poster of the plurality of interactive posters.

6. The system of claim 5 or the invention of any claim herein, wherein the user-specific experience data of the user is transmitted, in real time, to the at least one server.

7. The system of claim 1 or the invention of any claim herein, wherein the software application and the at least one server are further configured for:
   transmitting to the user, in real-time, data associated with a session/experience regarding the user's interaction with the plurality of interactive posters, the data including a deliverable that comprises the user selections made on the plurality of interactive posters as well as additional information, wherein the additional information is determined based on the user selections that are communicated to the user via the wireless protocol.

8. The system of claim 7 or the invention of any claim herein, wherein the additional information is of interest or otherwise useful to one or both of the user and/or an entity associated with the plurality of interactive posters or the Software application.

9. The system of claim 7 or claim 8 or the invention of any claim herein, wherein the additional information includes one or more of:

(i) subject matter related to information displayed on the plurality of interactive posters;

(ii) subject matter related to information displayed in the one or more regions;

(iii) statistics regarding a plurality of individuals who have interacted with the posters;

(iv) a recommendation to the user, including personalized information based on the user's selections on the posters and/or other information associated with the user known or acquired in connection with the user's engagement with the plurality of interactive posters;

(v) a recommendation regarding a service that is of interest or benefit to the user;

(vi) a recommended subscription to an information-providing and/or other service;

(vii) expanding one or more existing relationships with the user; and/or (viii) establishing a new relationship with the user.

10. The system of claim 1 or the invention of any claim herein, wherein at least one of the plurality of interactive posters is a touch-activated display.

11. The system of claim 1 or the invention of any claim herein, wherein at least one of the plurality of interactive posters is a composite structure having a foundation substrate layer and a touch-activated electronically-coded interactive display imagery, comprising conductive ink.

12. The system of claim 11 or the invention of any claim herein, wherein the foundation substrate layer comprises one or more materials chosen from at least one paper-based material, at least one plastic-based material, at least one wood-based material, and at least one stone-based material.

13. The system of claim 1 or the invention of any claim herein, wherein the software application is further configured to:

provide, to the user of the first computing device, interactive GUI functionality that enables the user to update or change the touch selections that the user made when interacting with the plurality of interactive posters.

14. The system of claim 1 or the invention of any claim herein, wherein the at least one server is configured to:

track, in real time, touch selection data regarding touch interactions made by individuals in geographically-separate interactive poster installations; and provide, in real time, the touch selection data to the user.

15. The system of claim 1 or the invention of any claim herein, wherein the software application may process the plurality of interactive posters as Bluetooth low energy (BLE) peripherals.

16. A computer-implemented method for processing interactions between a user and one or more interactive posters, the method comprising:

executing, upon detection of a first computing device in proximity to the one or more interactive posters, a software application on the first computing device that provides an interactive session between a user associated with the first computing device and the one or more interactive posters;

establishing secure communications over a network between the software application and at least one server, wherein the at least one server is configured to maintain status regarding the interactive session as well as real-time data regarding the user's interactions with the one or more interactive posters;

connecting the first computing device to the one or more interactive posters via a wireless protocol;

securely tracking, via the software application and the at least one server, a user-specific experience including selections made by the user at each of the one or more interactive posters;

obtaining identification information regarding the user including a name, a mobile phone number, and/or an identifying image of the user;

encrypting the identification information as well as information associated with the user-specific experience;

transmitting the encrypted information to the at least one server;

decrypting, via the at least one server, the encrypted information and storing it in at least one data store associated with the at least one server; and generating, via the at least one server, a deliverable for the user, the deliverable comprising a customized Web page including the user selections as well as additional information based on the user selections and/or other information associated with the user known or acquired in connection with the user's engagement with the interactive posters;

embedding, via the at least one server, a URL link of the customized Web page into an SMS message; and delivering the SMS message; wherein selection of the URL link on a phone or mobile device that receives the SMS message loads the customized Web page with the user selections and the additional information.

17. The method of claim 16 or the invention of any claim herein, wherein the interactive Web page generated comprises GUI functionality enabling the user to augment and/or refine the initial output of the interactive Web page to create a customized output.

18. The method of claim 16 or the invention of any claim herein, further comprising:

installing, upon detection of a first computing device in proximity to the one or more interactive posters, the software application on the first computing device.

19. The method of claim 16 or the invention of any claim herein, wherein the wireless protocol comprises Bluetooth or a near-field wireless communication (NFC) protocol.

20. The method of claim 16 or the invention of any claim herein, wherein the user selections are mirrored in real-time to the first computing device and/or to a mobile device associated with the user.

21. The method of claim 16 or the invention of any claim herein, wherein the software application and the at least one server track, securely, statistics regarding a plurality of individuals interactions with the one or more interactive posters.

22. The method of claim 21 or the invention of any claim herein, wherein the statistics are mirrored in real-time to the first computing device and/or to a mobile device associated with the user.

23. The method of claim 16 or the invention of any claim herein, wherein the identifying image comprises a selfie.

24. The method of claim 23 or the invention of any claim herein, further comprising:

providing filtering, augmentation or other adjustment of the selfie to create an adjusted image to display in place of the selfie.

25. The method of claim 16 or the invention of any claim herein, further comprising:
   utilizing and SMS message provider to deliver the SMS message.

26. A computer-implemented method for processing information, the method comprising:
   configuring one or more interactive posters to electronically communicate via Bluetooth or NFC with each other and a first computing device located near the posters;
   establishing an interactive session between a software application installed on the mobile device, at least one server, and the interactive posters, wherein the interactive session is secured by initiating secure communication with the mobile device via a Bluetooth or NFC authentication process and transmitting encrypted communications between the mobile device and the at least one server;
   tracking in real-time:
      (i) data regarding touch selections made on the interactive posters; and
      (ii) a sequence of interactions that a user makes with the interactive posters, wherein the sequence is tracked via Bluetooth or NFC mapping of the mobile device's position in relation to the interactive posters;
   performing processing, via the software application, including:
      displaying simulations of the posters on the first computing device, wherein the software application processes the posters as NFC or Bluetooth low energy (BLE) peripherals in generating the simulations;
      providing interactive GUI elements within each of the simulations, wherein the interactive GUI elements provide graphical indicia that mirror, in real time, the user selections of the interactive posters that correspond to each respective simulation; and
      providing further functionality that provides the user with one or more additional features or recommendations related to content of the interactive posters and/or the user selections;
   wherein, as a function of the secured session and the encrypted communications, information associated with the touch selections of the user is maintained and processed securely while being mirrored to the software application and transmitted to one or more mobile devices associated with the user.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method for processing information, the method comprising:
   configuring one or more interactive posters to electronically communicate via near field communication (NFC) with a mobile computing device located near the posters;
   establishing an interactive session between a software application installed on the mobile computing device and the interactive posters, wherein the software application is configured to communicate with at least one server, and wherein the interactive session is secured by initiating secure communication between the mobile computing device and the posters via an authentication process;
   tracking:
      (i) data regarding touch selections made on the interactive posters; and
      (ii) a sequence of interactions that a user makes with the interactive posters;
   performing processing, via the software application, including:
      displaying simulations of the posters on the mobile computing device;
      providing interactive GUI elements within each of the simulations, wherein the interactive GUI elements provide graphical indicia that mirror the user selections of the interactive posters that correspond to each respective simulation;
   wherein, via one or more of the secure communications, a secured session and/or encrypted communications, information associated with the touch selections of the user is maintained and processed securely while being mirrored to the software application.

2. The method of claim 1 wherein the interactive session is further secured via transmitting encrypted communications between the mobile computing device and the at least one server.

3. The method of claim 1 wherein the sequence of interactions is tracked via mapping of the mobile computing device's position in relation to the interactive posters.

4. The method of claim 1, further comprising:
   providing further functionality that provides the user with one or more additional features or recommendations related to content of the interactive posters and/or the user selections;
   wherein the further functionality comprises GUI functionality enabling the user to one or both of augment and refine the interactive GUI elements to create a customized output.

5. The method of claim 1, further comprising:
   installing, upon detection that the mobile computing device is in proximity to the one or more interactive posters, the software application on the mobile computing device.

6. The method of claim 1, further comprising two or more of:
   mirroring the user selections in real-time to the mobile computing device and to another computing device associated with the user;
   securely tracking, by the software application and the at least one server, statistics regarding a plurality of individuals interactions with the one or more interactive posters; and
   providing, by the software application, to the user of the first computing device, interactive GUI functionality that enables the user to update or change the touch selections that the user made when interacting with the interactive posters.

7. The method of claim 1, further comprising:
   securely tracking, by the software application and the at least one server, statistics regarding a plurality of individuals interactions with the one or more interactive posters; and mirroring the statistics in real-time to one or both of the mobile computing device and another mobile device associated with the user.

8. The method of claim 1, wherein the GUI further comprises:
   i) respective interactive simulations of the respective interactive posters, each simulation comprising at least one interactive interface element that mirrors, in real time, the at least one real-time user-specific selection of the at least one electronically-coded portion of the respective electronically-coded interactive display imagery of the respective poster of the interactive posters, and
   ii) at least one statistic related to at least one selection of the at least one electronically-coded portion of the respective electronically-coded interactive display imagery of the respective poster of the interactive posters by at least one other user.

9. The method of claim 1, further comprising:
   transmitting, via one or both of the at least one server and the software application, to the user, in real-time, data associated with a user-specific experience regarding the user's interaction with the interactive posters, the data including a deliverable that comprises the user selections made on the interactive posters as well as additional information, wherein the additional information is determined based on the user selections that are communicated to the user via the wireless protocol.

10. The method of claim 9 wherein the additional information includes one or more of:
    (i) subject matter related to information displayed on the interactive posters;
    (ii) subject matter related to information displayed in the one or more regions;
    (iii) statistics regarding a plurality of individuals who have interacted with the posters;
    (iv) a recommendation to the user, including personalized information based on the user's selections on the posters and/or other information associated with the user known or acquired in connection with the user's engagement with the interactive posters;
    (v) a recommendation regarding a service that is of interest or benefit to the user;
    (vi) a recommended subscription to an information-providing and/or other service;
    (vii) expanding one or more existing relationships with the user; and/or
    (viii) establishing a new relationship with the user.

11. The method of claim 1, wherein one or both of:
    at least one of the interactive posters is a composite structure having a foundation substrate layer and a touch-activated electronically-coded interactive display imagery that comprises conductive ink; or
    wherein the software application processes the interactive posters as Bluetooth low energy (BLE) peripherals.

12. A computer-implemented method comprising:
    executing, upon detection of a first computing device in proximity to one or more interactive posters, a software application on the first computing device that provides an interactive session between a user associated with the first computing device and the one or more interactive posters;
    connecting the first computing device to the one or more interactive posters via a wireless protocol;
    tracking, via the software application, a user-specific experience including selections made by the user at each of the one or more interactive posters;
    obtaining identification information regarding the user including a name, a mobile phone number, and/or an identifying image of the user;
    generating, via one or both of the software application and at least one server, a deliverable for the user, the deliverable comprising a customized Web page including the user selections as well as additional information based on the user selections and/or other information associated with the user known or acquired in connection with the user's engagement with the interactive posters;
    generating a message to the user including a URL link of the customized Web page; and
    transmitting the message to one or both of the first computing device and/or a second mobile computing device associated with the user, wherein selection of the URL link loads the customized Web page with the user selections and the additional information.

13. The method of claim 12 further comprising:
    establishing secure communications over a network between the software application and at least one server, wherein the at least one server is configured to maintain status regarding the interactive session as well as real-time data regarding the user's interactions with the one or more interactive posters.

14. The method of claim 12 further comprising:
    encrypting the identification information as well as information associated with the user-specific experience;
    transmitting the encrypted information to the at least one server; and
    decrypting, via the at least one server, the encrypted information and storing it in at least one data store associated with the at least one server.

15. The method of claim 12, wherein the URL link is embedded into the message via the at least one server.

16. The method of claim 12, further comprising:
    installing, upon detection of a first computing device in proximity to the one or more interactive posters, the software application on the first computing device.

17. The method of claim 12, wherein two or more of:
    the wireless protocol comprises Bluetooth or a near-field wireless communication (NFC) protocol;
    the interactive Web page generated comprises GUI functionality enabling the user to augment and/or refine the initial output of the interactive Web page to create a customized output; and
    the user selections are mirrored in real-time to the first computing device and/or to a mobile device associated with the user.

18. The method of claim 12, wherein the software application and the at least one server track, securely, statistics regarding a plurality of individuals interactions with the one or more interactive posters.

19. The method of claim 18, wherein the statistics are mirrored in real-time to the first computing device and/or to a mobile device associated with the user.

20. The method of claim 12, wherein the identifying image comprises a selfie, and the method further comprises:
    providing filtering, augmentation, or other adjustment of the selfie to create an adjusted image to display in place of the selfie.

* * * * *